United States Patent
Huott et al.

(10) Patent No.: US 9,922,163 B2
(45) Date of Patent: Mar. 20, 2018

(54) PHYSICALLY AWARE TEST PATTERNS IN SEMICONDUCTOR FABRICATION

(71) Applicant: INTERNATIONAL BUSINESS MACHINES CORPORATION, Armonk, NY (US)

(72) Inventors: William V. Huott, Holmes, NY (US); Kevin M. McIvain, Delmar, NY (US); Samir K. Patel, Wappingers Falls, NY (US); Gary A. Van Huben, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/203,954

(22) Filed: Jul. 7, 2016

(65) Prior Publication Data

US 2018/0011962 A1    Jan. 11, 2018

(51) Int. Cl.
*G06F 9/455*     (2006.01)
*G06F 17/50*    (2006.01)

(52) U.S. Cl.
CPC ........ *G06F 17/5081* (2013.01); *G06F 17/504* (2013.01); *G06F 2217/12* (2013.01); *G06F 2217/14* (2013.01)

(58) Field of Classification Search
CPC .................................................. G06F 17/5081
USPC ....................................................... 716/111
See application file for complete search history.

(56) References Cited

U.S. PATENT DOCUMENTS

| | | | |
|---|---|---|---|
| 5,604,895 A * | 2/1997 | Raimi .............. | G01R 31/31835 703/13 |
| 7,047,510 B1 | 5/2006 | Chopra et al. | |
| 7,865,850 B1 | 1/2011 | Kao et al. | |
| 2006/0206840 A1* | 9/2006 | Iwamura ............. | G06F 17/5022 716/106 |

(Continued)

OTHER PUBLICATIONS

Cadence Design Systems, Inc., San Jose, Calif., "New Cadence Modus Test Solution Delivers Up to 3X Reduction in SoC Test Time," (http://www.prnewswire.com/news/cadence+design+systems%2C+inc.), Feb. 2, 2016, pp. 1-6.

*Primary Examiner* — Suresh Memula
(74) *Attorney, Agent, or Firm* — Cantor Colburn LLP; William A. Kinnaman, Jr.

(57) ABSTRACT

A method for fabricating a circuit comprises identifying a target on the circuit with a transitional sensitivity, determining a test pattern that stresses the target, generating a verification model at the hierarchy of the target, creating a pattern and translating the pattern into a verification assertion, running the verification with the translated pattern, determining whether the verification assertion is a possible verification assertion following the running of the verification, obtaining a state of source latches and pin inputs responsive to determining that the formal verification assertion is a possible verification assertion following the running of the formal verification, translating the formal verification assertion into a coverage event, running a simulation with the coverage event, determining whether the coverage event occurred, and creating a manufacturing test responsive to determining that the coverage event occurred.

20 Claims, 10 Drawing Sheets

(56) References Cited

U.S. PATENT DOCUMENTS

| | | | |
|---|---|---|---|
| 2010/0042959 A1* | 2/2010 | Bhinge | G06F 11/263 716/136 |
| 2012/0317534 A1* | 12/2012 | Bhinge | G06F 11/263 716/136 |
| 2014/0089875 A1 | 3/2014 | Arora et al. | |
| 2014/0258797 A1 | 9/2014 | Gorman et al. | |
| 2015/0161309 A1* | 6/2015 | Drasny | G06F 17/5031 716/107 |
| 2015/0254383 A1* | 9/2015 | Tso-Sheng | G06F 17/5022 716/107 |
| 2015/0310933 A1 | 10/2015 | Purushotham et al. | |

* cited by examiner

* The noise type is to be interpreted as described below.
 * iL: quiet net is low, noise direction is high.
 * iLS: quiet net is low, noise direction is low.
 * iH: quiet net is high, noise direction is low.
 * iHS: quiet net is high, noise direction is high.
 * ONoise=OutputNoise, CNoise=CouplingNoise (O+C)Noise=OutputNoise+CouplingNoise.
 *
 * The column marked 'T' indicates the analysis type
 * Netnames with a trailing '*' indicate estimated nets
 *
 * Notable Parameters:
 * NRCPADDING: 0.1 volts
 * ENABLEFLATNOISETHRESHOLD: YES
 * FLATNOISETHRESHOLD: 0.6 volts
 *
 * Units: volts, picoseconds, femtofarads, kiloohms, microhenry, milliamps
 *
*Net                                                                    Pin                                                    Noise
 Noise Noise Pulse Noise      DC    ONoise ONoise CNoise CNoise (O+C)Noise (O+C)Noise SrcPinName                    SrcMacroName              Rejection
*name                         name                                     type peak area width slack T
 noise peak area  peak  area        peak   area   peak   area                                     name         curve

NET110                        DRIVER110/Y              IHS  0.3874 53.4010 137.8582 -0.1188 S 0.0000 0.0000 0.0000 0.3874 53.4010
 0.3874  53.4010        Y     BUFFER_CELLX                      (20.0000 0.4000 85.0000 0.3000 166.0000 0.2600 inf 0.2500) (NET110) ( Not Scaled )
NET110                        DRIVER110/Y              IL   0.3896 53.5621 137.4700 -0.1215 S 0.0005 0.0028 0.4155 0.3868 53.1467
 0.3896  53.5621        Y     BUFFER_CELLX                      (20.0000 0.4000 85.0000 0.3000 166.0000 0.2600 inf 0.2500)@1.20 (NET110) (20.0000 0.3991 85.0000 0.2993 166.0000
 0.2594 inf 0.2495)@1.10

NET845                        DRIVER845/Y              ILS  0.4029 54.7744 135.9451 -0.1336 S 0.0000 0.0000 0.0000 0.4029 54.7744
 0.4029  54.7744        Y     BUFFER_CELLX                      (20.0000 0.4000 85.0000 0.3000 166.0000 0.2600 inf 0.2500) (NET845) ( Not Scaled )
NET845                        DRIVER845/Y              IH   0.3184 53.0497 166.5937 -0.0592 S 0.0007 0.0032 0.0371 0.3153 53.0126
 0.3184  53.0497        Y     BUFFER_CELLX                      (20.0000 0.4000 85.0000 0.3000 166.0000 0.2600 inf 0.2500)@1.20 (NET845) (20.0000 0.3988 85.0000 0.2991 166.0000
 0.2592 inf 0.2493)@1.10

* The noise type is to be interpreted as described below.
    * iL: quiet net is low, noise direction is high.
    * iLS: quiet net is low, noise direction is low.
    * iH: quiet net is high, noise direction is low.
    * iHS: quiet net is high, noise direction is high.
    * ONoise=OutputNoise, CNoise=CouplingNoise (O+C)Noise=OutputNoise+CouplingNoise.

* The column marked 'T' indicates the analysis type
* Netnames with a trailing '*' indicate estimated nets

* Notable Parameters:
    * NRCPADDING: 0.1 volts
    * ENABLEFLATNOISETHRESHOLD: YES
    * FLATNOISETHRESHOLD: 0.6 volts

* Units: volts, picoseconds, femtofarads, kiloohms, microhenry, milliamps

```
*Net                                                                  Noise
 Noise Noise Pulse  Noise         DC    ONoise ONoise CNoise CNoise (O+C)Noise (O+C)Noise SrcPinName                    SrcMacroName            Rejection
*name                             name                                type   peak   area   width  slack  T
 noise  peak  area   peak   area   peak                               name                          curve
======================================================================================================================================================
NET110              DRIVER110/Y                 iHS   0.3874 53.4010 137.8582 -0.1188  S 0.0000 0.0000  0.0000  0.3874 53.4010
0.3874  53.4010  Y                              (20.0000 0.4000 85.0000 0.3000 166.0000 0.2600 inf 0.2500) (NET110) ( Not Scaled )
NET110              DRIVER110/Y                 iL    0.3896 53.5621 137.4700 -0.1215  S 0.0005 0.0028  0.4155 0.3868 53.1467
0.3896  53.5621  Y                              (20.0000 0.4000 85.0000 0.3000 166.0000 0.2600 inf 0.2500)@1.20 (NET110) (20.0000 0.3991 85.0000 0.2993 166.0000
0.2594 inf 0.2495)@1.10

NET845              DRIVER845/Y                 iLS   0.4029 54.7744 135.9451 -0.1336  S 0.0000 0.0000  0.0000  0.4029 54.7744
0.4029  54.7744  Y                              (20.0000 0.4000 85.0000 0.3000 166.0000 0.2600 inf 0.2500) (NET845) ( Not Scaled )
NET845              DRIVER845/Y                 iH    0.3184 53.0497 166.5937 -0.0592  S 0.0007 0.0032  0.0371 0.3153 53.0126
0.3184  53.0497  Y                              (20.0000 0.4000 85.0000 0.3000 166.0000 0.2600 inf 0.2500)@1.20 (NET845) (20.0000 0.3988 85.0000 0.2991 166.0000
0.2592 inf 0.2493)@1.10
```

```
DESIGN ENTITY: RTSU. RTSU;

NET426_DLY <= DELAY( 1, NET426 ) @ CLOCK ;
NET853_DLY <= DELAY( 1, NET853 ) @ CLOCK ;
NET923_DLY <= DELAY( 1, NET923 ) @ CLOCK ;
NET297_DLY <= DELAY( 1, NET297 ) @ CLOCK ;
NET718_DLY <= DELAY( 1, NET718 ) @ CLOCK ;
NET355_DLY <= DELAY( 1, NET355 ) @ CLOCK ;
NET904_DLY <= DELAY( 1, NET904 ) @ CLOCK ;
NET334_DLY <= DELAY( 1, NET334 ) @ CLOCK ;
NET475_DLY <= DELAY( 1, NET475 ) @ CLOCK ;
NET557_DLY <= DELAY( 1, NET557 ) @ CLOCK ;
NET664_DLY <= DELAY( 1, NET664 ) @ CLOCK ;
NET845_DLY <= DELAY( 1, NET845 ) @ CLOCK ;
NET623_DLY <= DELAY( 1, NET623 ) @ CLOCK ;
NET789_DLY <= DELAY( 1, NET789 ) @ CLOCK ;

( fail: fail10: "RTSU: NET110 FAIL" ) <= NOT NET426_DLY AND NOT NET853_DLY
AND NOT NET923_DLY AND NOT NET297_DLY AND NOT NET475_DLY AND NOT
NET557_DLY AND NOT NET334_DLY AND NOT NET664_DLY AND NOT NET355_DLY AND
NOT NET414_DLY AND NOT NET718_DLY AND NOT NET904_DLY AND NOT NET789_DLY
AND NOT NET845_DLY AND NOT NET623_DLY
AND
NET426 AND NET853 AND NET923 AND NET297 AND NET475 AND NET557 AND NET334
AND NET664 AND NET355 AND NET414 AND NET718 AND NET904 AND NET789 AND
NET845 AND NET623;
```

PHYSICALLY AWARE TEST PATTERNS IN SEMICONDUCTOR FABRICATION

BACKGROUND

The present invention generally relates to semiconductor device fabrication, and more specifically, to testing semiconductor devices.

Semiconductor fabrication usually includes performing a variety of tests throughout the fabrication phases. Built-in self-test engines (BISTs) are often used to perform the tests.

There are a number of different BISTs used in the semiconductor industry to test semiconductor designs and systems. The ABIST (array built-in self-test) focuses on internal array circuitry. The PHY BIST (physical built-in self-test) focuses on the physical interfaces of the system. LBIST (logic built-in self-test) focuses on logic paths, and the FBIST (functional built-in self-test) focuses on running workload style operational sequences at the wafer, module, and system levels. The FBIST transcends clock and asynchronous boundaries across the chip.

SUMMARY

According to an embodiment of the present invention a method for fabricating a circuit, comprises identifying a target on the circuit with a transitional sensitivity, determining a test pattern that stresses the target, generating a verification model at the hierarchy of the target, creating a pattern and translating the pattern into a verification assertion, running the verification with the translated pattern, determining whether the verification assertion is a possible verification assertion following the running of the verification, obtaining a state of source latches and pin inputs responsive to determining that the formal verification assertion is a possible verification assertion following the running of the formal verification, translating the formal verification assertion into a coverage event, running a simulation with the coverage event, determining whether the coverage event occurred, and creating a manufacturing test responsive to determining that the coverage event occurred.

According to another embodiment of the present invention, a system comprises a memory, and a processor operative to identify a target on the circuit with a transitional sensitivity, determine a test pattern that stresses the target, generate a verification model at the hierarchy of the target, create a pattern and translating the pattern into a verification assertion, run the verification with the translated pattern, determine whether the verification assertion is a possible verification assertion following the running of the verification, obtain a state of source latches and pin inputs responsive to determining that the formal verification assertion is a possible verification assertion following the running of the formal verification, translate the formal verification assertion into a coverage event, run a simulation with the coverage event, determine whether the coverage event occurred, and create a manufacturing test responsive to determining that the coverage event occurred.

According to yet another embodiment of the present invention, a computer program product comprising a computer readable storage medium having program instructions embodied therewith, the program instructions executable by a processor to cause the processor to perform a method that comprises identifying a target on the circuit with a transitional sensitivity, determining a test pattern that stresses the target, generating a verification model at the hierarchy of the target, creating a pattern and translating the pattern into a verification assertion, running the verification with the translated pattern, determining whether the verification assertion is a possible verification assertion following the running of the verification, obtaining a state of source latches and pin inputs responsive to determining that the formal verification assertion is a possible verification assertion following the running of the formal verification, translating the formal verification assertion into a coverage event, running a simulation with the coverage event, determining whether the coverage event occurred, and creating a manufacturing test responsive to determining that the coverage event occurred.

BRIEF DESCRIPTION OF THE DRAWINGS

FIGS. 3A-3C illustrate reports, which may be generated by a quality assurance system which measures three dimensional noise.

DETAILED DESCRIPTION

The use of Built-in self-test engines (BISTs) is prevalent in the semiconductor industry. The LBIST focuses on logic paths and the FBIST focuses on running workload style operational sequences at the wafer, module, and system levels. However, the LBIST generally tests logic paths prior to fabricating the hardware while the FBIST tests the hardware without creating particular patterns at the logic path level.

During the chip design cycle, models of the chip are built, which are used to run functional verification. Functional verification is used to validate that the chip functions operate as designed where said design is documented in a design specification. The models used for functional verification are generally not aware of the physical design implementation.

Before being sent to manufacturing, functional verification has been used to determine that the logic design is qualified against the function specified in the design specification.

Formal verification is used to determine that the physical model of the chip matches the logical model of the chip.

After being manufactured, LBIST is used to test the logical structures on the chip to ensure that the manufactured chip is consistent with the physical model provided to the fabricator.

LBIST excels at testing interconnectivity and to ensure the chip structures are correct and that the manufactured chip is compliant against the physical model. Yet, LBIST does not test for many cycles, the tests operate on pieces of the chip and the test environment is very different than the normal operational environment.

FBIST is designed to perform functional tests within the real hardware. Functional tests performed by FBIST are similar in nature to the tests run in functional verification.

The functional state space of many ASICs is large and covering an entire state space with a functional exerciser such as FBIST would use a large amount of test time. In order to reduce test time, targeted FBIST test are desired.

Functional simulation, formal verification and LBIST already provide a means to ensure a chip has been correctly manufactured. However, they don't provide a method to determine the impact of the physical implementation and how the physical properties of the chip may affect functional margins.

Thus, it is desirable to incorporate physical awareness into the functional verification environment to determine whether functional patterns are susceptible to physical properties such as coupling or other physical features of interest. Incorporating physical awareness into the functional verification environment allows for more effective FBIST tests, better determination of which physical properties need to be fixed in a physical design prior to manufacturing, etc.

Thus, with current chip design and manufacturing methodologies, it is difficult to validate physical design margins or verify that specific faults are accommodated using functional patterns (as in an FBIST) if the functional patterns are not known to manipulate logic paths in a manner that may cause a fault.

In this regard, functional verification of a semiconductor system is not aware of the physical design structures and implementation, thus functional verification cannot effectively create functional tests that exploit physical structures of interest with specific test patterns. LBIST generally does not execute real functional patterns, and thus some patterns may be too stringent and cause a week path to determine a sort cutoff when the pattern may not occur in a functional environment. Conversely, a critical path in a function mode may not appear as a critical path in LBIST since the pattern may be weak in LBST.

The methods and systems described herein provide for a method of testing and fabricating a semiconductor device by creating an effective FBIST test that targets critical paths that are provoked to fail due to physical design properties. Physical design properties include, for example, wiring, particular circuits, process-voltage-temperature (PVT), noise sensitivity and signal integrity.

The methods and systems described herein provide for creating effective FBIST patterns that reduce the FBIST test time and improve the operation of semiconductor devices.

Figure 1:
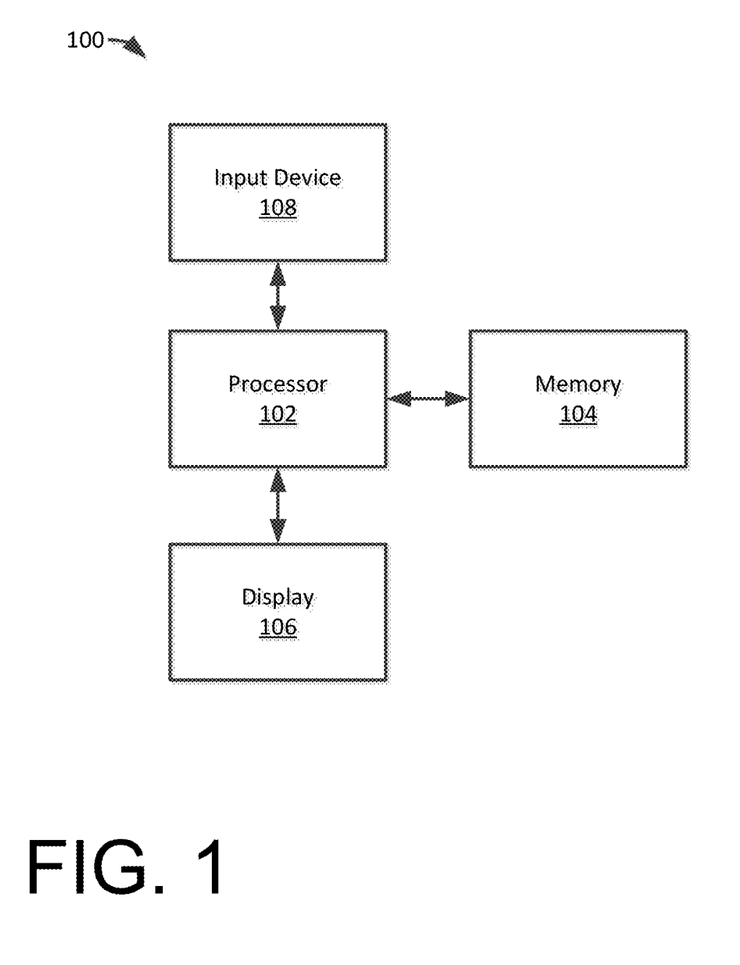
FIG. 1 illustrates a block diagram of an exemplary processing system.

FIG. 1 illustrates a block diagram of an exemplary processing system 100. The system 100 includes a processor 102. The processor is communicatively connected to a memory 104, a display 106, and an input device 108.

Figure 2A:
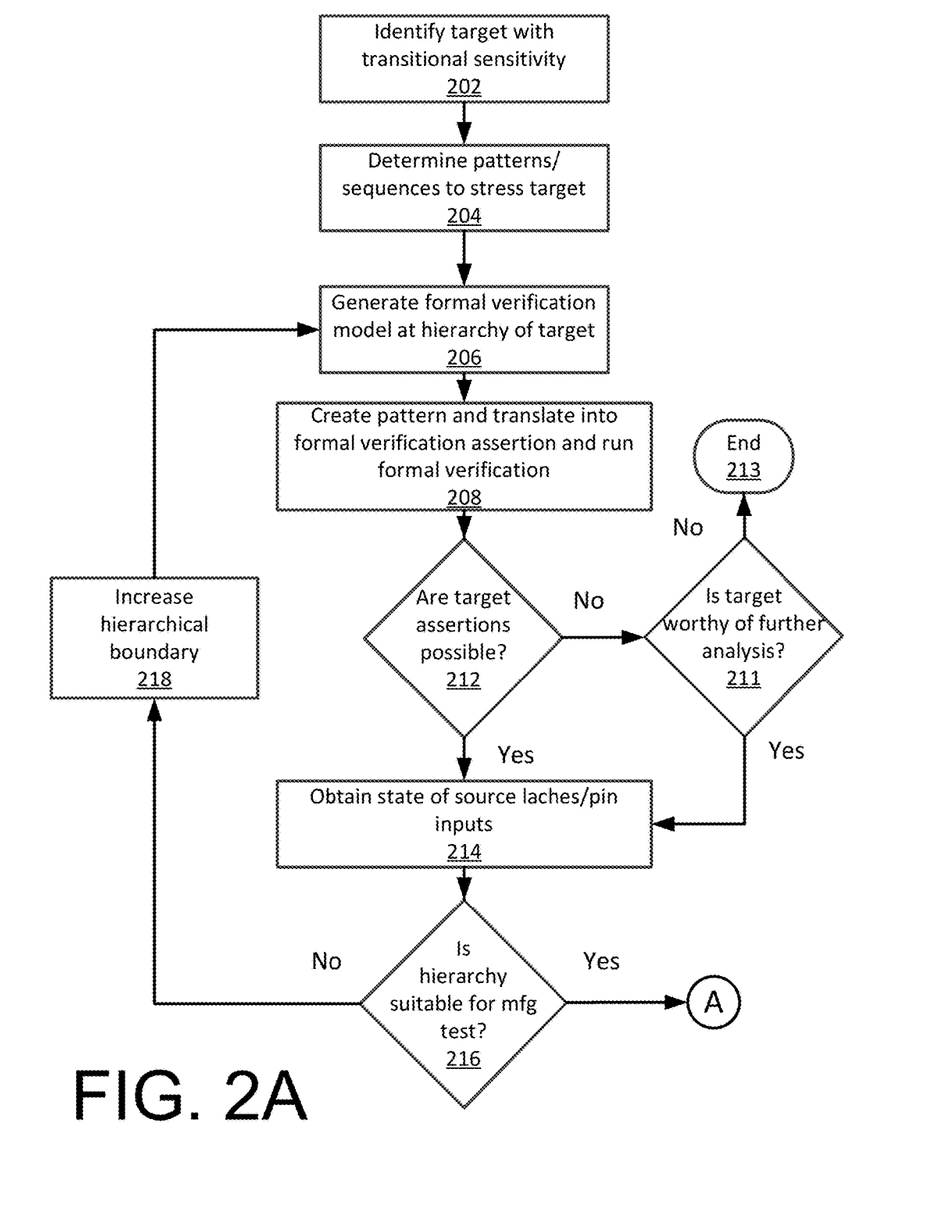
FIGS. 2A-2B illustrate a block diagram of an exemplary method of operation of the system of FIG. 1.
Figure 2B:
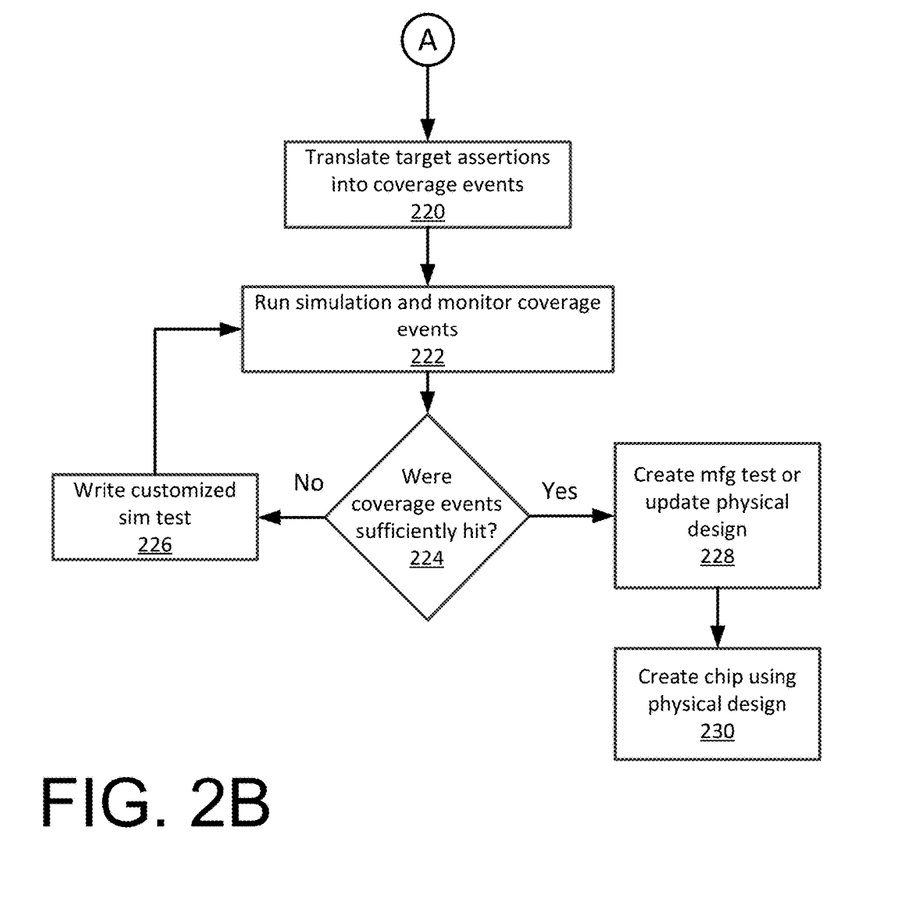

FIGS. 2A-2B illustrate a block diagram of an exemplary method of operation of the system 100 (of FIG. 1). In block 202, a report (of FIG. 3A-3B) that is generated by a quality assurance system is received. The system 100 identifies from the report, targets with transitional sensitivity. Targets may include one or more elements in a logic path of a circuit and transitional sensitivities include unmet performance parameters. Performance parameters include, for example, PVT parameters, three dimensional noise parameters, timing parameters, or other performance measurements.

Figure 3B:
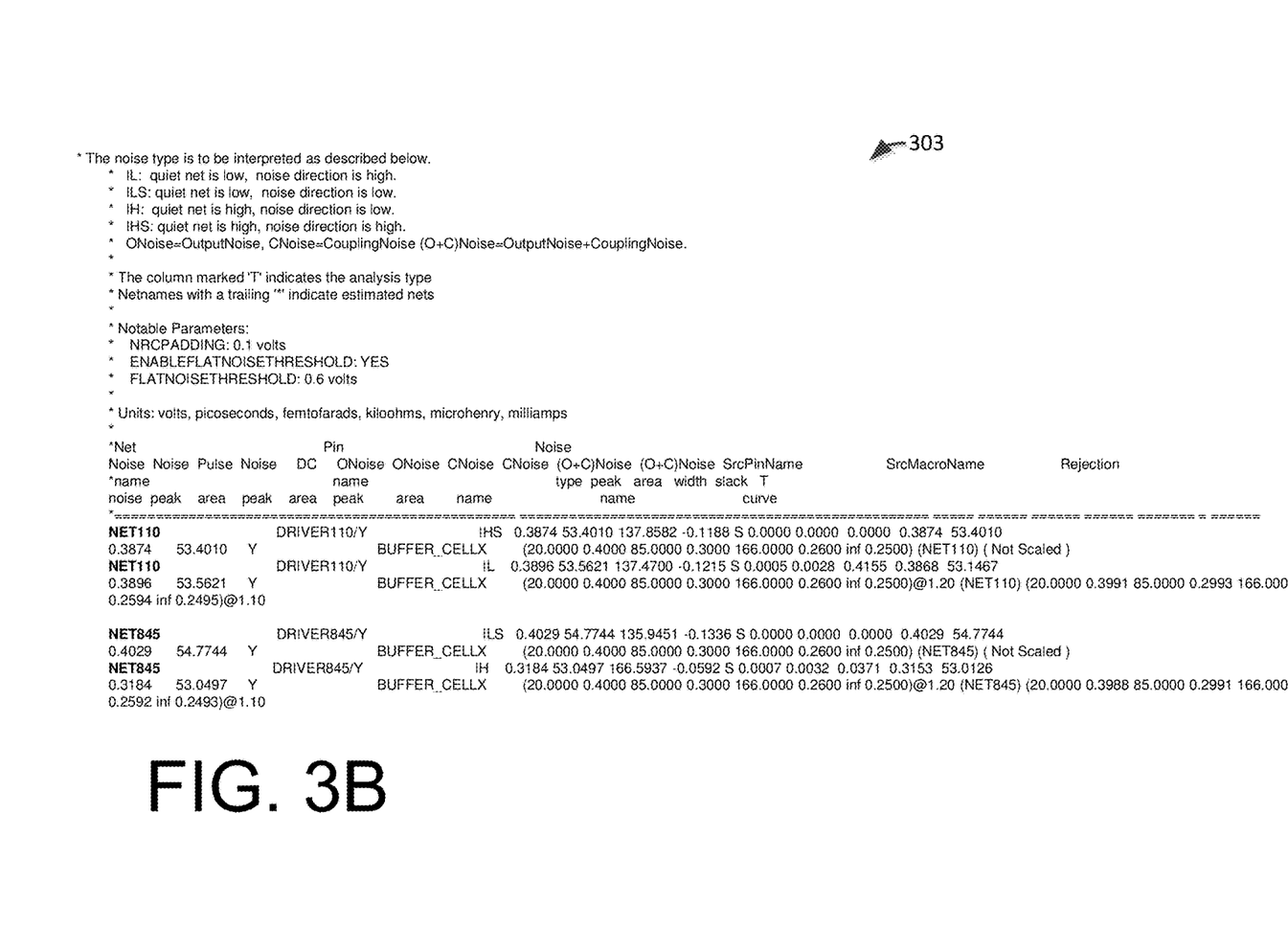
Figure 3C:
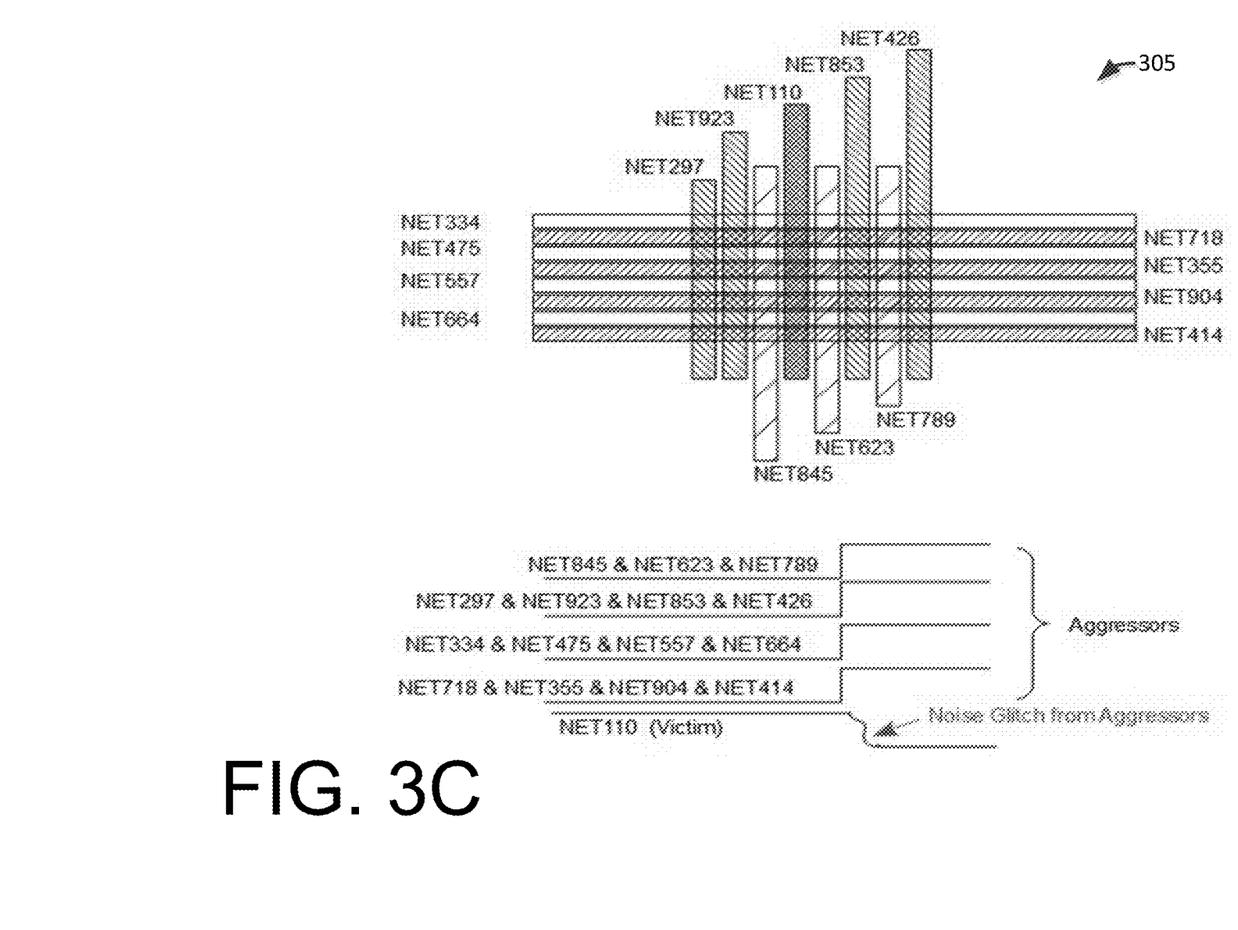

FIGS. 3A-3C illustrate reports, which may be generated by a quality assurance system which measures three dimensional noise. FIG. 3A illustrates a report 301 from a three dimensional noise system that determines which signal wires (nets) in a physical model may be impacted by signal noise which exceeds a threshold.

FIG. 3B illustrates a report 303 that indicates signal nets that have exceeded a threshold and the adjacent or neighbor signals that influence the noise such that it exceeds a threshold.

FIG. 3C illustrates a group of signals 305 in an exemplary physical design that have been reported as depicted in FIG. 3A and FIG. 3B by the quality assurance tools as recipients of coupling by one or more signal nets or sources of coupling to one or more signal nets.

Figure 4:
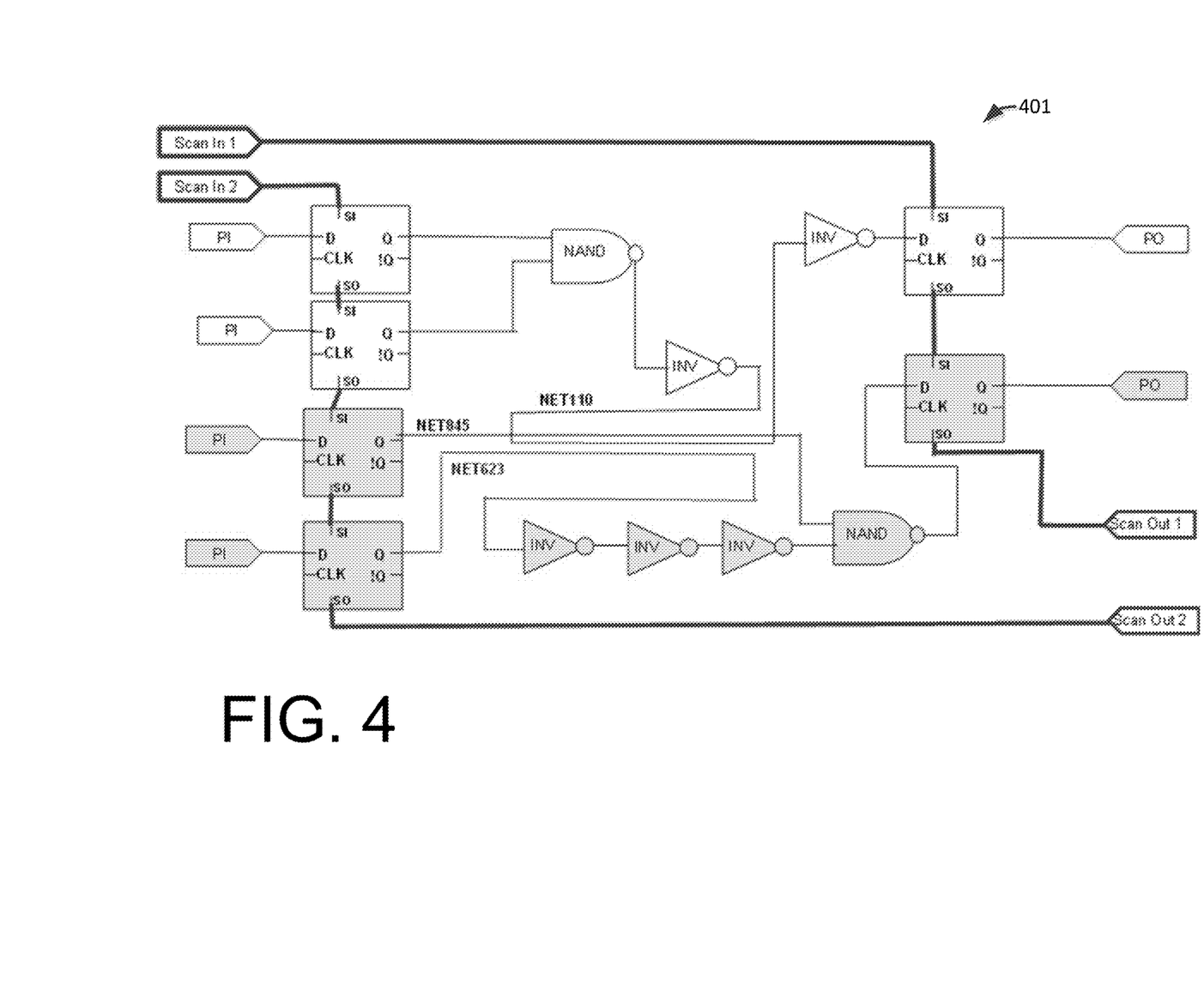
FIG. 4 illustrates an example of a simplified representation of a circuit as implemented in the physical model of a chip.

FIG. 4 illustrates an example of a simplified representation of a circuit 401 as implemented in the physical model of a chip. FIG. 4 further illustrates the interaction of two functionally exclusive logic circuits where signals NET845 and NET623 depicted in FIG. 3A-3C have been determined to influence the noise marginality and thresholds of other signals such as victim NET110. FIG. 4 further illustrates that two circuits that are logically exclusive may have physical dependencies. The circuit 401 shows a simplified representation of a circuit as implemented in the physical model that may be used by formal verification.

Figure 5:
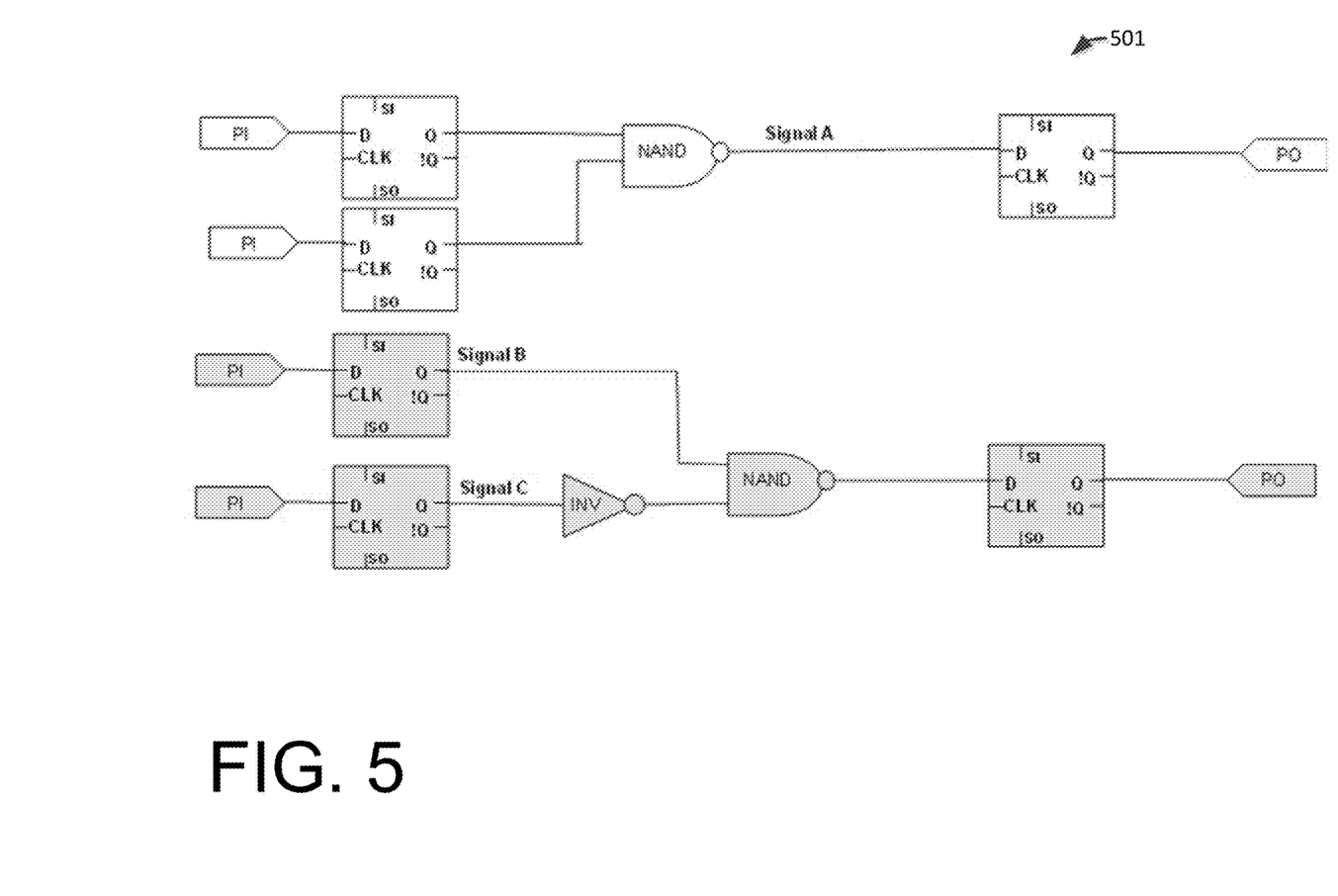
FIG. 5 illustrates a circuit that is logically equivalent to the circuit illustrated in FIG. 4.

FIG. 5 illustrates a circuit 501 that is logically equivalent to the circuit 401 illustrated in FIG. 4. FIG. 5 shows a simplified representation of a logical model, which may be used by functional verification. The circuit 501 is logically equivalent to the circuit 401, where the buffering inserted by physical design tools has been removed. Signal A in circuit 501 is equivalent to the logical inversion of signal NET110 in circuit 401 and Signal B and Signal C correspond to NET845 and NET623 in the circuit 401 respectively.

Figure 6:
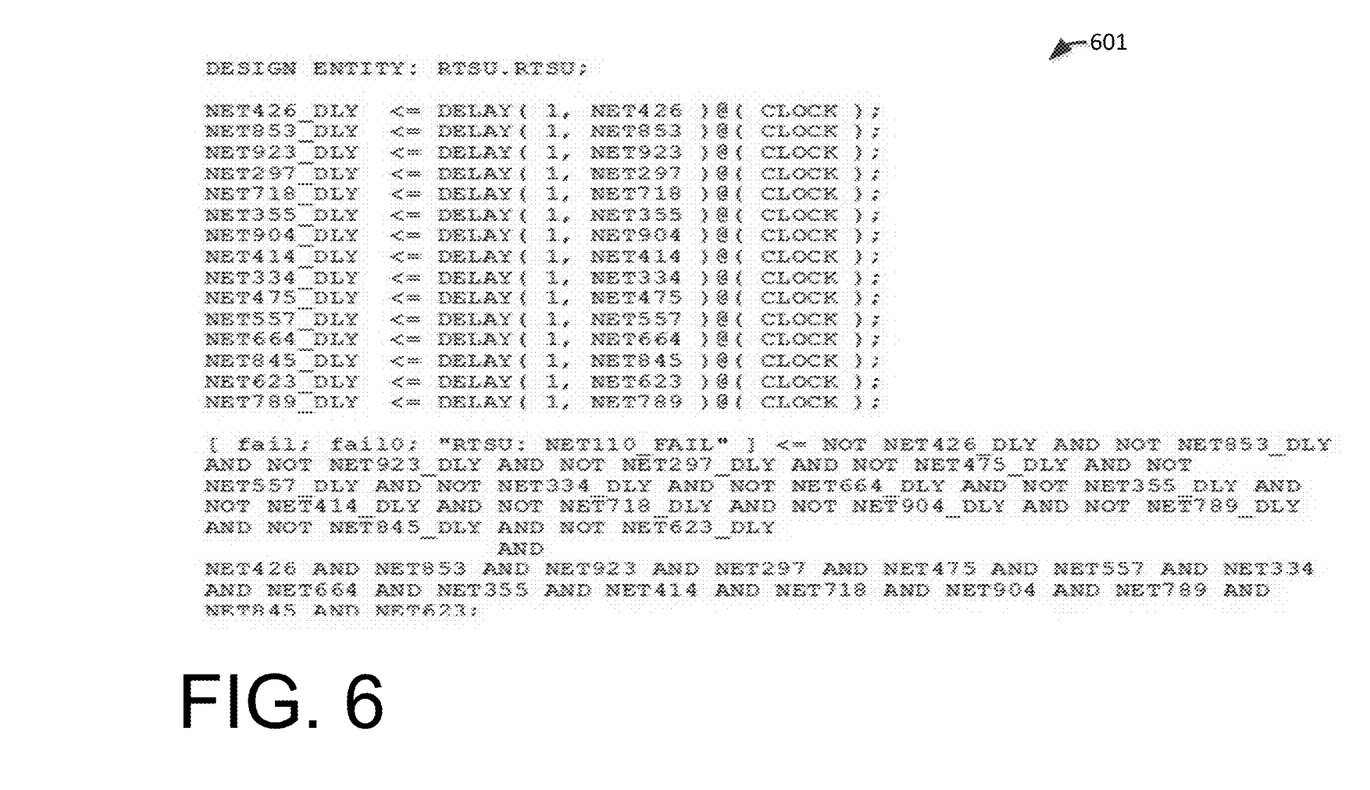
FIG. 6 illustrates a representation of a formal verification assertion for the signals shown in FIG. 3C.

FIG. 6 illustrates a representation of a formal verification assertion 601 for the signals 305 shown in FIG. 3C.

Figure 7:
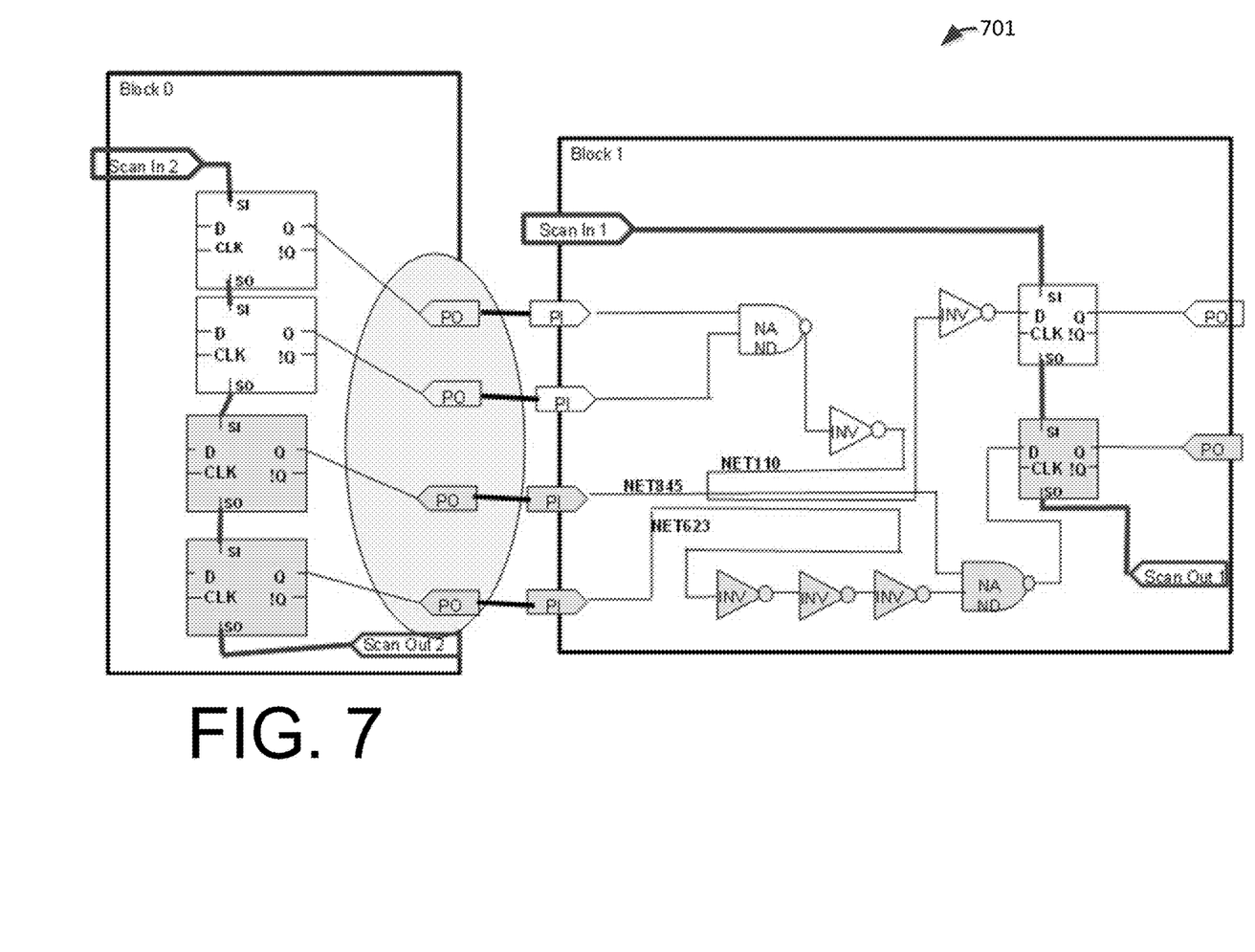
FIG. 7 illustrates a circuit, which is similar to the circuit of FIG. 4, where the source latches have been moved to a different logic block.

FIG. 7 illustrates a circuit 701, which is similar to the circuit 401 of FIG. 4 however, the source latches have been moved to a different logic block. Therefore, a higher level of hierarchy is used to include the source latches within the model.

In block 204, the system 100 determines test patterns and/or sequences that are used to stress the identified targets. For example, a report may indicate that a particular portion of a circuit layout design causes undesirable noise (noise above a threshold level) in a particular net. A net includes a connection between two or more circuits. The report may indicate that one or more nets when switched in a particular manner (e.g., when the all of the identified nets switch from 0 to 1) cause the undesirable noise. Thus the target is the identified nets, and the transitional sensitivity is undesirable noise.

Though the transitional sensitivity (fault) at the target will occur when the nets are switched in the identified particular manner, the actual fault may not occur if the logical operation of the final device will not result in the switching of the identified nets in the manner that will cause the fault. In other words, though such a fault may be possible if the nets behave in the identified manner, it is possible that the nets may not behave in the identified manner during the normal operation of the device. The method described below provides for determining the logical location of the identified nets, and whether the identified nets would actually switch in the identified manner when the device operates.

In FIG. 4 it is possible that during an LBIST test a pattern is loaded into the depicted latches through scan in 1 and scan in 2. It is also possible that after loading the pattern an LBIST engine pulses the clocks for a defined number of pulses. After the clocks are pulsed LBIST may read out the state of the latches by means of attachment to the scan out 1 and scan out 2. It is possible that LBIST may return a fail due to coupling noise between NET110, NET845 and NET623. However, during normal operational mode the two logic circuits are exclusive where only one circuit may be active at a time. Therefore the LBIST fail may be a false fail. If said LBIST is employed to sort parts, some parts may be discarded for the false fail. Further, if the two logical circuits are not exclusive and may run at the same time the LBIST fail may be valid. However, the LBIST operational environment may be different than normal functional operation where environmental conditions such as operation temperatures, power supply noise and signaling noise may differ. Under such conditional differences, the LBIST pass may be a false pass, where a targeted FBIST test may fail.

A formal verification model at the hierarchy of the target is generated in block 206. The target hierarchy is the hierarchy level of the target. Hierarchy may include, for example, chip level, units, macros, or any other level of hierarchy in an integrated circuit. In our current example, the hierarchy of the identified nets may be determined by using, for example, a look up table or other references associated with the circuit design. The formal verification model may include, for example, a very high speed integrated circuit insertion module (VIM), or a gate level verification log (verilog). In the example, FIG. 4 may represent a high level example of the starting hierarchy level to generate a formal verification model.

In block 208, patterns are created and translated into a formal verification assertion. An assertion is a translation of a pattern that should result in causing a fault or other behavior in a logic circuit. In our example, the assertions may include determining whether the identified target nets will switch from all zeroes to all ones. Other examples may include more complex assertions that may include temporal relationships between elements.\

Once the formal verification assertion has been created, the formal verification is run. Formal verification will prove or disprove the assertion by performing a proof against an abstract mathematical model of the hierarchy that bounds the target. The formal verification proof uses a systematic and exhaustive exploration of the mathematical model to determine whether the state transition(s) defined by the assertion are possible.

The system 100 (of FIG. 1) determines whether the target assertions (similar to the assertions 601 of FIG. 6) are possible in block 212. In this regard, the formal verification will determine whether the formal verification assertion is logically possible with respect to the operation of the device. Considering our example, if the target nets will not all switch from 0 to 1 at anytime during the operation of the device, the target assertion is not possible.

In block 211 the user or the system 100 may determine whether the target is worthy of further analysis if the target assertions are not possible. If no, the method may end in block 213. If yes in block 211 or 212, the targeted assertions have been proven by formal verification and the states of the source latches and pin inputs which trigger the assertion(s) at the target hierarchy may be determined by the output of the formal verification run.

In block 216, an assessment is performed to determine whether the identified higher level facilities are arranged at a suitable hierarchy to perform a manufacturing test. For example, if the target is located in a low level macro, the source latches and pin inputs are controllable by manufacturing test. It is possible that an input pin may be driven from another source latch which is implemented at a higher level or parallel level of hierarchy. In this case performing a test on the low level macro may not work and the next higher level of hierarchy may be needed. If the hierarchical boundary is determined to be unsuitable, no in block 216, the hierarchical boundary may be increased in block 218. The hierarchical boundary may be increased by choosing the next higher hierarchical boundary that overlaps with the current hierarchical boundary. Such an increase may have a logical connection to the source latches or pin inputs in the current hierarchy. FIG. 7 depicts a scenario where the circuit 401 of FIG. 4 has had the source latches moved into another logic block, indicated by block 0. Because, the source latches do not reside in the current hierarchy level, represented by block 1, the hierarchy is increased such that both block 0 and block 1 are included in order to include the source latches in the formal verification model.

After increasing the hierarchical boundary in block 218, an updated formal verification is generated at the increased hierarchical boundary in block 206. In this regard, in the example, if the hierarchical boundary is increased to a higher level in the hierarchy, the functional verification assertions may remain the same or may be altered to represent the states of the source latches and pin inputs that were proven by the previous formal verification run to ultimately drive the logic cones that produce the identified fault. The altering of said assertions would promote a reduced run time of formal verification.

If the hierarchy is suitable for a manufacturing (mfg) test in block 216, the target assertions are translated into coverage events in block 220 (of FIG. 2B). The target assertions, which are determined to be suitable for manufacturing test may be applied at pin inputs and source latches of a hierarchical level that are controllable by manufacturing tests. Pin inputs and source level latches are common across models such as the formal verification model, simulation model and physical model. This commonality ensures easy translation of assertions and coverage events between models. For example, in block 220 coverage events in the simulation model are created from the states of input pins and source latches obtained in box 214 that were proven by using targeted assertions in the formal verification model to produce a fault.

In block 222 the simulated manufacturing test is run and coverage events are monitored. In block 224 the system 100 or user will determine whether the simulated manufacturing test is sufficient to result in the coverage event (i.e., causing the fault or operating the device in the manner that should cause the identified fault). If no, a customized simulated manufacturing test may be written in block 226. In addition, in block 222 the simulation may include but is not limited to functional simulation. By running other types of simulation in block 222, such as functional simulation, the identification of said fault may be exposed in multiple operational modes of the system, not only manufacturing test. This is important as manufacturing test conditions do not always correlate to functional operation.

If yes, in block 228, a manufacturing test (e.g., FBIST, MCBIST, LBIST, ABIST) is created and may be run on a physical chip. Alternatively, the design may be updated to remove the target fault from the design. A chip may be created using the physical design in block 230. If the chip in created block 230 will not be fixed, updates to a system which employs said chip may be considered in order to avoid triggering the identified fault.

The exemplary methods and systems described herein provide for identifying faults in a circuit design at the physical level, and tracing the faults to the logical level to generate a testing strategy that incorporates the logical design and physical design into the test. The methods and systems may be used to redesign a chip prior to fabrication, or troubleshoot and improve the performance of an existing chip.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for fabricating a circuit, the method comprising:
   identifying a target on the circuit with a transitional sensitivity;
   determining a test pattern that stresses the target;
   generating a verification model at the hierarchy of the target;
   creating a pattern and translating the pattern into a verification assertion;
   running the verification with the verification assertion;
   determining whether the verification assertion is a possible verification assertion following the running of the verification;
   obtaining a state of source latches and pin inputs responsive to determining that the verification assertion is a possible verification assertion following the running of the verification;
   translating the verification assertion into a coverage event;
   running a simulation with the coverage event;
   determining whether the coverage event occurred; and
   creating a manufacturing test responsive to determining that the coverage event occurred.

2. The method of claim 1, further comprising creating a chip with the fabricated circuit after creating the manufacturing test.

3. The method of claim 1, further comprising writing a simulation test responsive to determining that the coverage event did not occur.

4. The method of claim 1, further comprising generating an input to a physical design checking program such that the program alters checking results responsive to a coverage event occurrence.

5. The method of claim 1, further comprising:
   determining whether a hierarchical boundary of the obtained state of the source latches and pin inputs is suitable for the manufacturing test after obtaining the state of source latches and pin inputs; and
   increasing the hierarchical boundary of the obtained state of the source latches and pin inputs responsive to determining that the obtained state of the source latches and pin inputs is not suitable for the manufacturing test after obtaining the state of source latches and pin inputs.

6. The method of claim 5, further comprising generating an updated verification model after increasing the hierarchical boundary of the obtained state of the source latches and pin inputs.

7. The method of claim 5, wherein the increasing the hierarchical boundary of the obtained state of the source latches and pin inputs includes choosing a next higher hierarchical boundary that overlaps with a current hierarchical boundary of the obtained state of the source latches and pin inputs.

8. A system comprising:
   a memory; and
   a processor operative to:
      identify a target on the circuit with a transitional sensitivity;
      determine a test pattern that stresses the target;
      generate a verification model at the hierarchy of the target;
      create a pattern and translating the pattern into a verification assertion;
      run the verification with the verification assertion;
      determine whether the verification assertion is a possible verification assertion following the running of the verification;
      obtain a state of source latches and pin inputs responsive to determining that the verification assertion is a possible verification assertion following the running of the verification assertion;
      translate the verification assertion into a coverage event;
      run a simulation with the coverage event;
      determine whether the coverage event occurred; and
      create a manufacturing test responsive to determining that the coverage event occurred.

9. The system of claim 8, wherein the processor is further operative to create a chip with the fabricated circuit after creating the manufacturing test.

10. The system of claim 8, wherein the processor is further operative to write a simulation test responsive to determining that the coverage event did not occur.

11. The system of claim 8, wherein the processor is further operative to generate an input to a physical design checking program such that the program alters checking results responsive to a coverage event occurrence.

12. The system of claim 8, wherein the processor is further operative to:
   determining whether a hierarchical boundary of the obtained state of the source latches and pin inputs is suitable for the manufacturing test after obtaining the state of source latches and pin inputs; and
   increasing the hierarchical boundary of the obtained state of the source latches and pin inputs responsive to determining that the obtained state of the source latches and pin inputs is not suitable for the manufacturing test after obtaining the state of source latches and pin inputs.

13. The system of claim 12, wherein the processor is further operative to generate an updated verification model after increasing the hierarchical boundary of the obtained state of the source latches and pin inputs.

14. The system of claim 12, wherein the increasing the hierarchical boundary of the obtained state of the source latches and pin inputs includes choosing a next higher hierarchical boundary that overlaps with a current hierarchical boundary of the obtained state of the source latches and pin inputs.

15. A computer program product comprising a non-transitory computer readable storage medium having program instructions embodied therewith, the program instructions executable by a processor to cause the processor to perform a method comprising:
   identifying a target on the circuit with a transitional sensitivity;
   determining a test pattern that stresses the target;
   generating a verification model at the hierarchy of the target;
   creating a pattern and translating the pattern into a verification assertion;
   running the verification with the verification assertion;
   determining whether the verification assertion is a possible verification assertion following the running of the verification;

obtaining a state of source latches and pin inputs responsive to determining that the verification assertion is a possible verification assertion following the running of the verification assertion;

translating the verification assertion into a coverage event;

running a simulation with the coverage event;

determining whether the coverage event occurred; and creating a manufacturing test responsive to determining that the coverage event occurred.

16. The computer program product of claim 15, wherein the method further comprises creating a chip with the fabricated circuit after creating the manufacturing test.

17. The computer program product of claim 15, wherein the method further comprises writing a simulation test responsive to determining that the coverage event did not occur.

18. The computer program product of claim 15, wherein the method further comprises generating an input to a physical design checking program such that the program alters checking results responsive to a coverage event occurrence.

19. The computer program product of claim 15, wherein the method further comprises:

determining whether a hierarchical boundary of the obtained state of the source latches and pin inputs is suitable for the manufacturing test after obtaining the state of source latches and pin inputs; and increasing the hierarchical boundary of the obtained state of the source latches and pin inputs responsive to determining that the obtained state of the source latches and pin inputs is not suitable for the manufacturing test after obtaining the state of source latches and pin inputs.

20. The computer program product of claim 19, wherein the increasing the hierarchical boundary of the obtained state of the source latches and pin inputs includes choosing a next higher hierarchical boundary that overlaps with a current hierarchical boundary of the obtained state of the source latches and pin inputs.

* * * * *